Dec. 24, 1940.  W. J. DONNELLY  2,226,200
TRAP MECHANISM
Filed Sept. 8, 1939
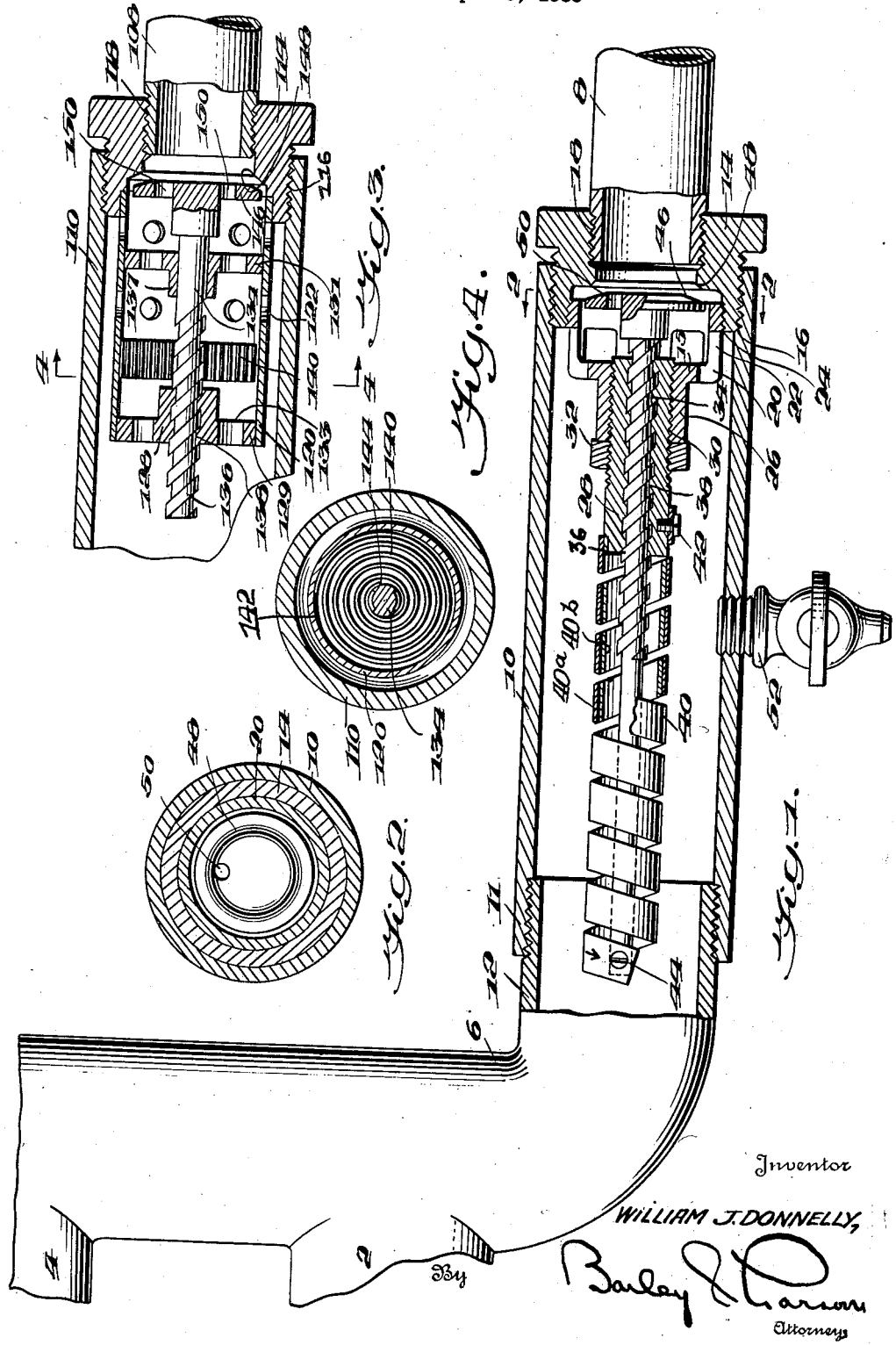
Inventor
WILLIAM J. DONNELLY,
By
Attorneys Patented Dec. 24, 1940

2,226,200

UNITED STATES PATENT OFFICE 2,226,200

TRAP MECHANISM

William J. Donnelly, New Britain, Conn.

Application September 8, 1939, Serial No. 294,035

3 Claims. (Cl. 236—59)

The primary object of this invention is to provide a thermostatically controlled trap mechanism for steam systems.

The novel device has particular utility in removing the water condensed in closed steam heating circuits, and when interposed in the return line between the end of a heating unit and the boiler, has successfully replaced pressure operated dump traps. An object of the invention is to provide a device operable by the heat of the steam or water in the system.

It is now intended to provide a trap which, when the temperature of the steam is above 212° F., is driven to a closed position substantially to cut off the return pipe. Bleeder means, however, are provided for allowing condensed water to flow through the ejector even in closed position. When the temperature of the water and steam in the end of the system falls below 212° F., at which time much condensation occurs, the trap is automatically opened to its widest position whereby to allow relatively little or no steam pressure to drive the condensed water out of the heating unit and back to the boiler through the return pipe by gravity.

Another object is to provide a trap positively driven between open and closed positions by a thermal responsive unit interposed directly in the path of the heat carrying fluid controlled thereby.

Still another objective is to prevent chattering, rattling and knocking in a steam heating system and in the trap and to provide a self-cleaning mechanism.

Since considerable difficulty has been encountered in cleaning mud and other deposits from valves and traps of this nature, it is an objective to support the entire assembly of thermostatic trap elements on a simple, readily removable member. At the same time, it is intended to provide an assembly which extends longitudinally in a standard pipe section of relatively small diameter.

Still again, it is an object to provide a thermostatic trap normally open, the working range of which is readily changeable and which may easily be tested.

These and other objectives will appear from the following specification and drawing, in which:

Fig. 1 is a view of the trap unit, partially in cross section, with other elements of the system broken away;

Fig. 2 is a cross section along the lines 2—2 of Fig. 1, looking in the direction of the arrows;

Fig. 3 is a cross-sectional view of a modification; and

Fig. 4 is a cross section along the lines 4—4 of Fig. 3, looking in the direction of the arrows.

Referring first to Figs. 1 and 2, the system of which the invention forms a part includes a plurality of steam pipes, two of which are indicated at 2 and 4, supplied with steam under pressure of from 50 to 60 pounds by a boiler not shown. The steam pipes are connected by a header, the lower end of which is connected by return pipe to the boiler.

The new device is mounted in the return line circuit between the lower end of the header 6 and the return line 8, and includes the casing pipe 10 threaded at 11 to a pipe 12 leading from the lower end of header 6.

The thermostatic trap is supported in its entirety by the hollow nut 14, which is threadedly engaged in the end of casing pipe 10 as indicated by the reference numeral 16, and into which return pipe 8 is threaded at 18. A cage 20, having openings 22 in the sides thereof, is threadedly engaged with threads on the inner side of hollow nut 14, the end 15 of the cage being formed as a spider, centrally from which the hollow, internally threaded post 26 extends.

Threadedly engaged, as shown at 30, through hollow post 26 so as to be axially adjustable relative thereto, sleeve 28 is held in adjusted position by lock nut 32. An elongated stem 34, having square threads 36 extending at an acute angle to the axis of the stem is engaged in sleeve 28 with complementary internal threads 38 in sleeve 28 so that as the stem is rotated it is thereby driven axially in the sleeve.

Thermostatic means for rotatably driving the stem are provided in the flat, bimetallic helix 40, the fixed end of which is rigidly secured by screw 42 to the end of sleeve 28, the other end being secured by screw 44 to the end of stem 34 so that as helix 40 expands the stem is rotated and thereby driven towards an ejector-closing position. The helix 40 is comprised of strips 40a and 40b of brass and nickel, respectively, bonded together. Other metals having different coefficients of expansion could, of course, be used in the manner well known in the art. It should be noted that when spring 40 is subjected to the heat of steam it becomes longer in a helical direction and, since one end is anchored to sleeve 28, it must rotate the stem in the direction of the arrow. Because of the direction of the threads 36 and 38 on the stem and sleeve, the overall, end to end length of the helix is decreased by crowding the convolutions thereof closer together, thus to provide a tight, positive driving and holding of the stem, and thus to accomplish self-cleaning of the helix from mineral or corrosive deposits thereon.

At the other end, stem 34 carries a head 46 which seats against the face of seat 48 bevelled on the inner side of nut 14. Particular note should be made of the bleeder hole 50 which passes through head 46. Hole 50, which may be increased in size where relatively great condensation constantly occurs in the system, always allows condensed water to pass to the return pipe and back into the boiler. A petcock 52 is provided in the lower side of casing 10 for manual draining when the system is shut down in cold weather.

In operation, when the steam and water at the bottom of header 6 is sufficiently hot so that relatively little condensation occurs, helix 40 will then be expanded by the heat and head 46 will, accordingly, be seated substantially to close off the boiler return pipe 8. When head 46 is closed, the heat-carrying steam is allowed to circulate in the steam pipes, with the water produced by normal condensation being bled off through bleeder hole 50.

However, when great condensation occurs in the system and casing 10 fills up with cooler water, helix 40 will return head 46 to the position shown in Fig. 1, thus to open the return line passage. When head 46 is open, that is, away from the seat, relatively little or no steam pressure is required to drive the condensed water collected in casing 10 and the radiating system back into the boiler through the return line.

The trap may be adjusted to operate at different temperatures by loosening lock nut 32 and rotating sleeve 28 in hollow post 26, thus to raise or lower the initial position of head 46 relative to seat 48. One feature of the invention is that in such an adjustment the relationship of helix 40 to supporting sleeve 28 and stem 34 is not altered, thus making for easy calibration. And helix spring 40, when cool, is always relaxed, regardless of the temperature range to which the ejector is adjusted, the life of all working parts is increased.

In the modification shown in Figs. 3 and 4, casing pipe 110 has a nut 114 threadedly supported therein by threads 116. The return line 108, as described in Fig. 1, leads to the boiler and is threaded into nut 114 as designated by reference numeral 118.

Sleeve member 120, having a plurality of apertures 122 therethrough, is rigidly secured, as by brazing, to nut 114. Annular disks 129 and 131, each having a plurality of passages 133 therethrough, are brazed in sleeve 120, as shown in Fig. 3. Annular disk 129 supports an internally threaded bearing collar 128, and disk 131 has a bearing 137 at its center.

Stem 134, having square external threads 136 thereon, is supported in the bearing collars, with threads 136 on the stem engaged with threads 138 in bearing collar 129. A flat coil bimetallic element 140 having its outer end 142 rigidly anchored to sleeve 120 and its inner end affixed to stem 130, as shown in Fig. 4, provides the thermal-responsive motivation of this modification. Element 140, when cool, is in the position shown in Fig. 3, but when heated, the element increases in length and rotates stem 134. Threads 136 and 138 on the stem 134 and bearing sleeve 128 cause stem 134 to move axially, thus to move head 146, carried by the stem, relative to seat 148 bevelled in nut 114. Head 146 has bleeder holes 150 which function in the manner of holes 50 of Fig. 1.

Both modifications have been highly successful in large commercial type steam heating systems, such as, in green houses and brick drying systems, wherein seventy or more transverse steam pipes of the type designated by reference numerals 2 and 4 are used. Relatively little space is needed for the trap mechanisms, and they may be operated in any position because of the positive actuation.

The invention may be applied not only to the exact structure shown and described, but also to all mechanical alterations and substitutions, as may the following claims:

I claim:

1. A trap for a steam heating system, comprising a casing adapted to be connected at the lower outlet end of a steam pipe system, a member removably mounted in said casing having a seat thereon, a cage mounted on said member, a sleeve supported on said cage and threadedly engaged therewith so as to be selectively adjustable axially towards and away from said seat, said sleeve having internally extending threads therein, a head cooperating with said seat and having a stem with an externally threaded portion intermediate the end thereof, said externally threaded portion being threadedly engaged through the internally threaded portion of said sleeve so that rotation in one direction of said stem drives said head towards said seat, and a bimetallic helix attached at one end to said sleeve and at the other end to the free end of said stem, the direction of the convolutions of said helix being such that increase in the helical length thereof rotates said stem in said one direction, said member, cage, sleeve, head and stem and helix being removable as a unit for adjustment.

2. A trap mechanism for steam utilizing systems, comprising a member, means on said member for removably mounting the same in a casing section, said member having a valve seat thereon, a cage element mounted on said member, a sleeve element adjustably supported on said cage element so as to be adjustable towards and away from said seat, threads on the inner side of said sleeve, a valve head cooperating with said seat and having a stem, threads on said stem threadedly engaged in said sleeve element whereby rotation of said stem drives said head relative to said seat, and a bimetallic helix connected, at one end, to said stem and, at the other end, to one of said elements whereby, upon increase in the temperature of said helix, to rotate said stem relative to the sleeve to drive said valve, the relationship of said threads and said helix being such that the overall length of said helix is decreased, thereby pressing the convolutions of said helix together upon said increase in temperature.

3. A trap mechanism for steam utilizing systems, comprising a member, means on said member for removably mounting the same in a casing section, said member having a valve seat thereon, a cage mounted on said member above and spaced from said seat, said cage having a cylindrical portion with threads therein concentric with the axis of said seat, a sleeve threadedly engaged through said cylindrical portion so as to be adjustable towards and away from said seat, said sleeve having threads on the inner and outer sides thereof, a valve head between said seat and said cylindrical portion cooperating with said seat and having a threaded stem threadedly engaged through said sleeve whereby rotation of said stem in one direction drives said head towards said seat, said stem extending beyond said sleeve, and a bimetallic helix surrounding said stem, means connecting one end of said helix to said sleeve and means connecting the other end of said helix to the extended end of said stem whereby, upon increase in temperature, said helix rotates said stem in said one direction to drive said head towards said seat, the threading of said stem, by rotation of said stem in said one direction, through said sleeve decreasing the end-to-end length of said helix.

WILLIAM J. DONNELLY.